United States Patent [19]

Lacey et al.

[11] Patent Number: 4,875,589

[45] Date of Patent: Oct. 24, 1989

[54] MONITORING SYSTEM

[75] Inventors: Paul D. Lacey, Portsmouth; Anthony Martin, Fareham, both of England

[73] Assignee: De La Rue Systems, Ltd., England

[21] Appl. No.: 159,218

[22] Filed: Feb. 23, 1988

[30] Foreign Application Priority Data

Feb. 24, 1987 [GB] United Kingdom ................. 8704269

[51] Int. Cl.[4] ......................... B07C 5/342; G06K 9/82

[52] U.S. Cl. ......................................... 209/534; 382/7; 382/50

[58] Field of Search ....................... 209/534; 382/7, 50, 382/53; 364/579, 580

[56] References Cited

U.S. PATENT DOCUMENTS 4,231,014 10/1980 Ponzio ................................ 382/7 X
4,417,336 11/1983 Weilbacker ..................... 364/580 X
4,465,192 8/1984 Ohba et al. .......................... 209/534
4,539,702 9/1985 Oka ................................. 209/534 X
4,542,829 9/1985 Emery et al. ....................... 209/534
4,562,486 12/1985 Suzuki et al. ..................... 382/53 X
4,691,239 9/1987 Nelson et al. ..................... 382/53 X

*Primary Examiner*—Johnny D. Cherry
*Assistant Examiner*—Edward M. Wacyra
*Attorney, Agent, or Firm*—Ostrolenk, Faber, Gerb & Soffen

[57] ABSTRACT

A monitoring system, particularly for use with document sorting apparatus, comprises a sensor assembly including a sensor for sensing a respective characteristic of an article and for generating a corresponding first output signal, and a detector controller for applying at least one of a predetermined set of algorithms to the first output signal from the sensor, in conjunction with data supplied to the detector controller, to generate one or more second output signals. A detector processor common to each of the sensor assemblies supplies the data and algorithm selection information to the detector controllers to control which of the set of algorithms is applied by the detector controller and to generate in response to the or each second output signal and reference data a third output signal representative of the characteristic of the article being monitored.

13 Claims, 3 Drawing Sheets

MONITORING SYSTEM

FIELD OF THE INVENTION

The invention relates to a monitoring system for monitoring characteristics of articles, particularly sheets such as banknotes and other security documents.

DESCRIPTION OF THE PRIOR ART

There is a requirement in the field of document handling, particularly banknote handling, to examine one or more characteristics of the documents. These characteristics include the condition of the documents (e.g. degree of soiling, presence of holes/tears, mechanical thickness, limpness and the like), the authenticity of the document (e.g. by monitoring fluorescence, phosphorescence, magnetic ink, magnetic thread etc) and, in the case of documents of value such as banknotes, their denomination. For example, banks need to check banknotes which they receive to determine whether they are in a fit condition for reissue or whether they should be destroyed and to sort them in to different denominations. Other institutions may wish to check that the documents are authentic, in other words they include some security feature indicating that they are genuine, and may also wish to check on the condition of the document for reissue.

Many article sorting systems have been developed in the past but they have been specifically designed to a user's requirement. The development of these sorting systems has been accompanied by the development of various sophisticated algorithms which are applied to signals from sensing equipment to provide an indication of the condition/authenticity/denomination of the articles. Different users, however, require different combinations of characteristics to be sensed and different algorithms to be applied to the signals from the sensors. Furthermore, different users have different requirements in terms of the range of acceptable characteristics considered allowable. This means that the algorithms have to be modified to take the different ranges into account. These special requirements of different users has lead to the development of sorting systems which are specific to each user thus leading to a relatively high cost for such systems. A further drawback is that should the user's requirements change after they have purchased the equipment, fundamental modifications are required within the processing equipment to implement those changes. This is particularly the case where a user wishes a different characteristic to be sensed or different algorithms to be applied.

SUMMARY OF THE INVENTION

In accordance with one aspect of the present invention, a monitoring system for monitoring one or more characteristics of articles comprises at least one sensor assembly including a sensor for sensing a respective characteristic of an article and for generating a corresponding first output signal, and first processing means for applying at least one of a predetermined set of algorithms to the first output signal from the sensor, in conjunction with data supplied to the first processing means, to generate one or more second output signals; and second processing means to which the second output signal is fed, the second processing means being adapted to supply said data and algorithm selection information to the first processing means to control which of the set of algorithms is applied by the first processing means and to generate in response to the or each second output signal and reference data a third output signal representative of the characteristic of the article being monitored.

The invention deals with a number of the problems set out above by providing sensor assemblies each having first processing means capable of applying any of a predetermined set of algorithms to the first output signal from the sensor. The choice of algorithm is determined by the second processing means which supplies suitable algorithm selection information to the first processing means. This avoids the need to substitute new hardware where different algorithms are required by the customer since these algorithms can simply be selected via the second processing means.

Preferably, the system comprises at least two sensor assemblies, the first processing means of each assembly being adapted to apply at least one of the same set of algorithms to the respective first output signals.

This significantly reduces the cost of the system since each sensor assembly is substantially the same in the sense that each first processing means is capable of applying any one or more of the same set of algorithms.

In some cases, the first processing means of a sensor assembly may be connected to two or more sensors.

In accordance with a second aspect of the present invention, a monitoring system for monitoring characteristics of articles comprises a plurality of sensor assemblies, each sensor assembly including a characteristic sensor for sensing a respective characteristic of an article and for generating a corresponding first output signal, and first processing means for applying in conjunction with data supplied to the first processing means at least one predetermined algorithm to the first output signal from the sensor to generate a second output signal; and second processing means to which the second output signal from each of the first processing means is fed, the second processing means being adapted to supply to each first processing means said data to enable the or each algorithm to be performed and to generate in response to the or each second output signal and reference data a third output signal representative of the characteristic of the article being monitored.

By separating the processing of signals from the sensors into two parts carried out by the first and second processing means respectively, it is a relatively simple matter to adjust the acceptable ranges required by different customers by suitably choosing the data supplied to the first processing means by the second processing means.

In most examples, the first processing means will be suitably programmed to carry out the or each algorithm.

Preferably, the second processing means includes storage means for storing the data to be supplied to the first processing means.

The use of storage means for storing the data enables the manufacturer of the monitoring system to supply a customer with a customised system in which all the customised information is stored in the storage means. Conveniently, therefore, the storage means is also adapted to store the reference data.

In some cases, if the customer's requirements change, the storage means can be replaced by another storage means but preferably the content of the storage means can be changed, in use.

The algorithms which are applied to the first output signals may take any conventional form but preferably the data supplied to the first processing means by the second processing means comprises one or more thresholds, the application of the or each algorithm to the first output signals generating respective, single values, and the first processing means being adapted to compare the or each value with a corresponding threshold and to generate the second output signal which has one of two states depending upon the relationship of the value with the corresponding threshold.

This enables the second output signal to be of a very simple nature having a binary form which typically indicates whether the value generated as a result of applying the algorithm to the first output signal is or is not greater than the threshold.

Typically, the reference data will be in the form of a truth table with which the binary second signals are compared to determine whether the combination of second signals obtained corresponds to an acceptable or unacceptable article or, in the case of banknotes, to indicate the denomination of banknote.

The monitoring system according to the invention can be used in a variety of applications to monitor characteristics of articles. For example, the systems can be used simply to record characteristics of articles fed between an input position and an output position.

The invention is particularly applicable, however, to apparatus for sorting articles, the apparatus comprising a transport system; a diverter assembly to which articles are conveyed by the transport system; a monitoring system according to the first or second aspects of the invention for monitoring at least one characteristic of articles fed by the transport system towards the diverter assembly; and control means to cause the diverter assembly to guide articles in a direction selected in accordance with the third output signals from the second processing means.

Conveniently, the control means comprises third processing means although in some cases, the control means could be provided by the second processing means.

BRIEF DESCRIPTION OF THE DRAWINGS

In order that the invention may be better understood, an example of a banknote sorting machine incorporating a monitoring system according to the invention will now be described with reference to the accompanying drawings, in which.

DETAILED DESCRIPTION OF AN EMBODIMENT

Figure 1:
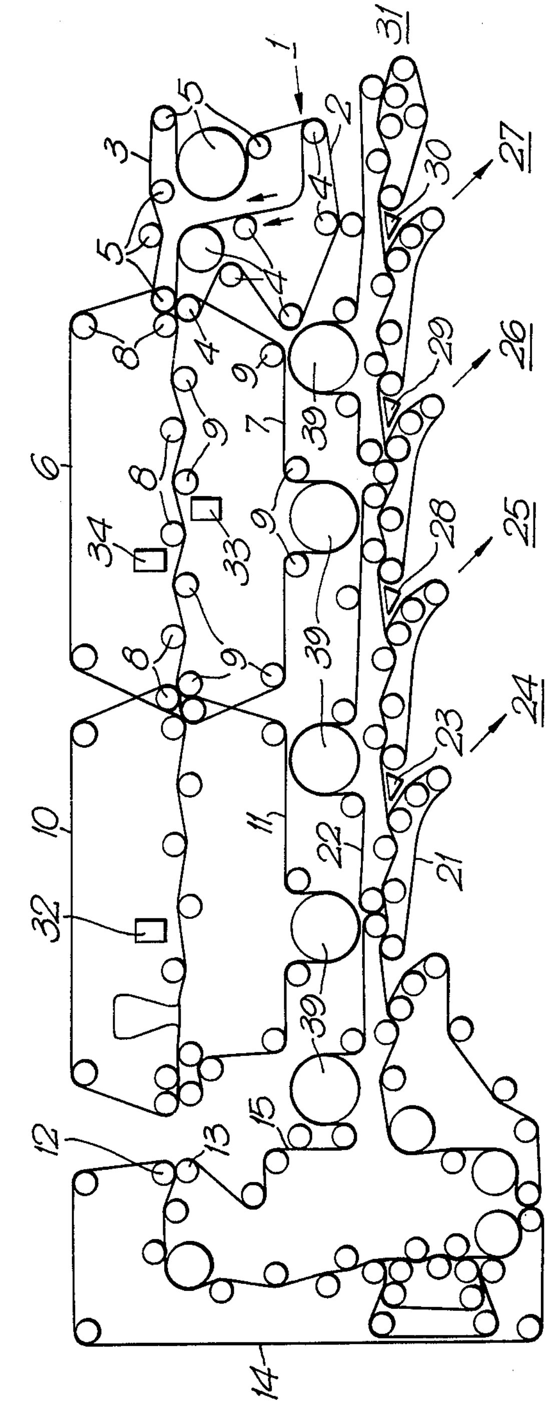
FIG. 1 is a schematic side elevation of the banknote feed assembly.

In the banknote sorting machine shown in FIG. 1 banknotes enter a first feed path at an input station 1 and pass between a pair of belts 2, 3 entrained around respective rollers 4, 5. The banknotes, which are fed singly, pass from the first feed path defined by the belts 2, 3 into a second feed path defined by two pairs of laterally offset belts 6, 7 entrained around rollers 8, 9 respectively. The banknotes then pass into a third feed path defined by a pair of belts 10, 11.

The banknotes pass from the third feed path into a nip between apair of rollers 12, 13 defining part of a doubles detect system which may be of a conventional form for example based on the disclosure in EP-A-0130825 which is incorporated herein by reference. The banknotes subsequently pass along a fourth feed path defined by belts 14, 15 to a fifth feed path defined by belts 21, 22. This feed path leads to a first diverter 23 and, as can be seen in FIG. 1, banknotes can be fed to a first stacking position 24 for stacking in a conventional manner by a stacker wheel or the like (not shown) or to further stacking postions 25–27 in accordance with the positions of diverters 28–30 respectively. Finally, the notes could be fed to an output station 31 if the diverter 30 is suitably oriented.

As the notes pass along the second and third feed paths defined by the belt.s 6,7; 10,11 respectively they pass three sensor heads 33, 34,32.

The sensor head 32 may be adapted for use in sensing the denomination of the banknote while the sensors 33, 34 may be adapted to sense the degree of soiling of the banknote. It should be noted that the sensors 33, 34 are positioned on opposite sides of the second feed path and this, in conjunction with the lateral offset of the belts 6,7, allows the soil condition of opposite sides of the same portion of the banknote to be monitored.

The belts are driven from a single drive motor (not shown) which drives a number of capstans 39 each of which is associated with one of the belts of each pair defining the various banknote feed paths.

Figure 2:
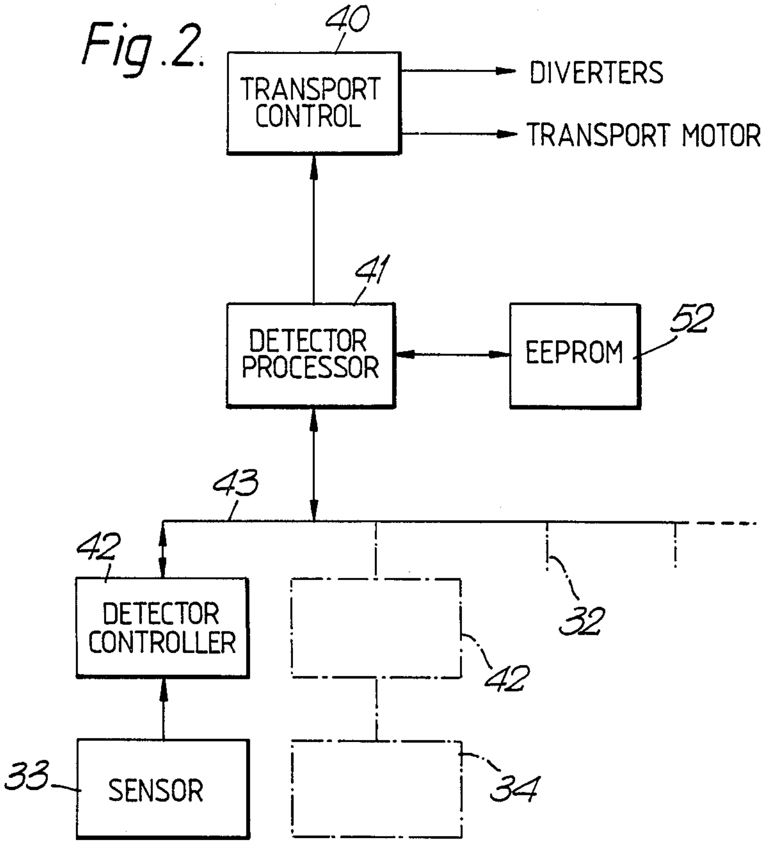
FIG. 2 is a block diagram of part of the monitoring system.

Operation of the drive motor and the diverters 23, 28–30 is controlled by a transport control microprocessor 40 (FIG. 2). The transport control microprocessor 40 is connected to a detector processor 41 of a monitoring system. The monitoring system includes a number of sensor assemblies which, in the FIG. 1 example, totals four. These assemblies include the denomination detector 32, the soil detectors 33, 34, and the doubles detect system 12, 13.

The sensor heads 32, 33, 34 of each sensor assembly (shown schematically in FIG. 2) are connected to respective (first) detector controller microprocessors 42 linked by a common bus 43 with the (second) detector processor 41. In some cases a microprocessor 42 could be connected to more than one sensor head. It is important to note that the detector controller 42 of each sensor assembly is substantially the same. Thus, only one detector controller 42 and sensor assembly 33 will be described in detail.

Figure 3:
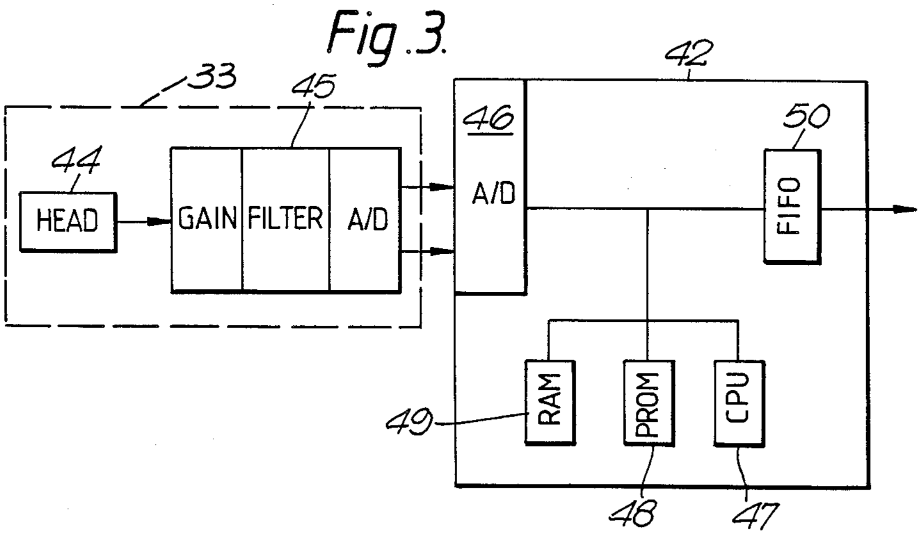
FIG. 3 is a block diagram of a sensor assembly of the monitoring system shown in FIG. 2.

FIG. 3 illustrates the sensor assembly 33 which comprises a sensor head 44 for sensing radiation received from the banknote passing under the head. It will be understood that the banknote is irradiated in an appropriate manner corresponding to the types of conditions to be sensed.

Figure 4:
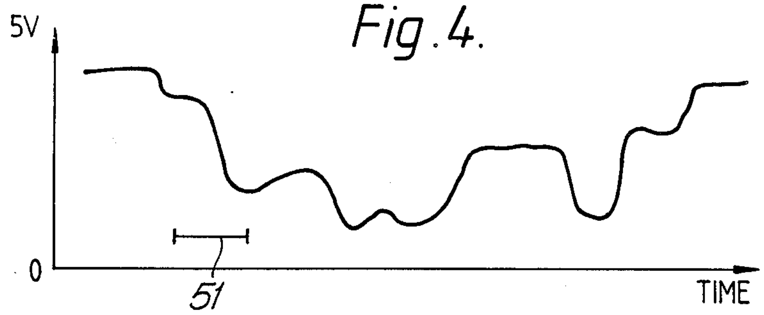
FIG. 4 illustrates a typical form of an output signal from the sensor of the sensor assembly shown in FIG. 3; and, FIG. 5 is a flow diagram illustrating operation of the detector controller shown in FIG. 3.

The head 44 generates an analogue outpu signal for example as shown in FIG. 4. This signal is fed to a preliminary processing board 45 which adjusts the gain of the analogue signal and filters the analogue signal to pre-process the signal, remove noise and the like. The analogue signal is then digitised in two stages the first of which is contained in the board 45 and the second of which 46 is contained in the detector controller 42. The digitised signal is then acted on by the detector controller 42. The detector controller 42 comprises a microprocessor 47, a PROM 48, and a RAM 49 as well as a FIFO shift register 50.

Each detector controller 42 holds in the PROM 48 the same program enabling the microprocessor 47 to apply one or more of a number of algorithms to the digitised signal from the attached sensor.

Examples of algorithms which might be applied to the incoming signal, where soil detection is required, are to find the peak value of the signal, to find the mean value of the signal, or to determine the maximum slope of the signal. This latter algorithm would provide an indication of localised soiling. To apply any of these algorithms, a window of a specified width, as for example shown in FIG. 4 by reference numeral 51, is scanned across the digitised signal. To achieve this, the incoming signal is sampled at regular intervals, for example corresponding to millimetre increments of the banknote passing the sensor head and the sampled values of the signal are stored in the RAM 49. The microprocessor 47 then scans the window 51 across the sampled data and at each position of the window 51 determines the required value. If for example the maximum slope is required, the microprocessor 47 determines the slope of the signal occuring within the window at each scan position and after the scanning process is finished determines the maximum figure.

In order for the det.ector controller 42 to operate, the microprocessor 47 must be controlled to apply the correct selection of algorithms to the incoming signal and, in the example described above, to apply the correct width window 51. This information differs between users and to obtain maximum flexibility, this customised information is stored in an EEPROM 52 (or a PROM or non-volatile RAM) accessible by the detector processor 41.

Figure 5:
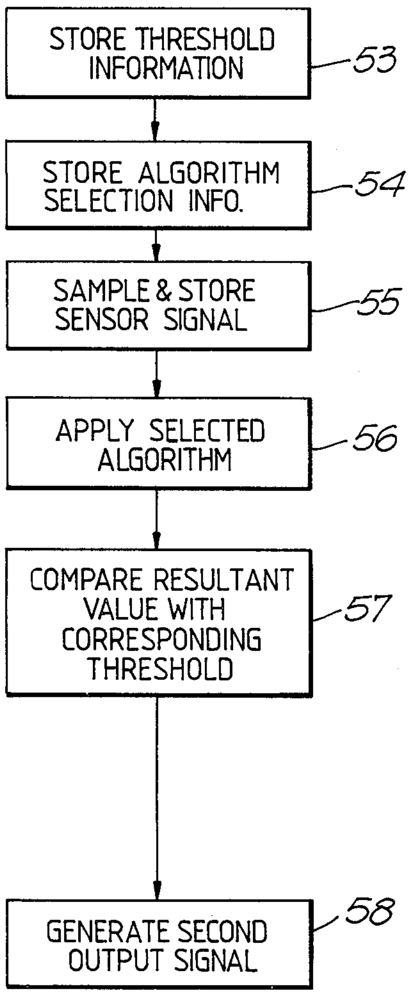

Prior to operation, information defining the algorithms to be applied by each detector controller together with data required by the detector controller to carry out those algorithms is stored in the EEPROM 52. This data and algorithm selection information is then accessed by the detector processor 41 and supplied to the appropriate detector controllers 42 each of which stores the information in the RAM 49. This is indicated by steps 53, 54 in FIG. 5.

Banknotes are then fed through the sorting machine and as each banknote passes the respective sensor heads 44 it will be illuminated and reflected light sensed by the heads 44 to generate respective output signals Alternatively, or additionally, the heads 44 could be responsive to phosphorescence, fluorescence, magnetic effects etc. These output signals are modified, as explained above, are sampled and digitised and stored in the corresponding RAMs 49 of each detector controller 42 (step 55).

The microprocessor 47 acting under the control of the program in the PROM 48 applies one or more algorithms to the sampled signal as selected by the detector processor 41. The algorithm is applied in conjunction with windows defined by data downloaded from the detector processor 41 to the detector controller 42 and the application of each algorithm (step 56) will result in respective single values representing for example the maximum slope or peak value of the incoming signal.

The detector processor 41 also obtains from the EEPROM 52 threshold data which is downloaded to the detector controller 42 so that the resultant value obtained by each algorithm is compared with the corresponding threshold (step 57).

The microprocessor 47 then generates a binary output signal for each applied algorithm indicating the relationship between the value obtained by applying the algorithm and the corresponding threshold (step 58). Essentially, this "second" output signal represents a YES/NO answer to the question "does the value generated by the algorithm exceed a corresponding threshold?"

Communication with the detector processor 41 is via the FIFO register 50 and bus 43 and the YES/NO replies are fed to the detector processor 41.

The detector processor 41 thus builds up in its own memory (not shown) a table indicating in the form of YES/NO data the different conditions of the banknote. This combination of conditions is then compared by the detector processor 41 with a truth table stored in the EEPROM 52 and as a result of this comparison, the detector processor 41 generates an output signal which is fed to the transport control microprocessor 40. The transport control microprocessor 40 then adjusts the positions of the diverters 23, 28–30 accordingly. For example, if the banknote is determined to be unsuitable due to excessive soiling, the transport control microprocessor 40 may set: the diverters 23, 28–30 such that the banknote passes to the output station 31. It will be seen in FIG. 1 that a variety of output positions are provided to enable different condition banknotes or different denomination banknotes to be sorted.

We claim:

1. An article monitoring system, comprising:

a plurality of sensor assemblies, each sensor assembly including a sensor for sensing a respective characteristic of an article and for generating a corresponding first signal; and processing means for applying respective predetermined algorithms to each said first signal to generate respective values therefrom, for comparing said respective values with respective predetermined thresholds to generate second, binary signals indicating the relationship of each value with said corresponding threshold, and for comparing said second signals with a set of predetermined second signals corresponding to a known type of article to generate a third signal indicating the relationship between the second signals and the set of predetermined second signals.

2. A system according to claim 1, wherein said third signal indicates whether an article under test from which said second signals are derived is of the same type as said known type of article.

3. A system according to claim 1, wherein said articles comprise banknotes, the article type comprising the condition of said banknotes.

4. A system according to claim 1, wherein said processing means includes a memory for storing therein said set of predetermined second signals.

5. A system according to claim 1, wherein said processing means generates each value by determining a respective one of the peak value, mean value and maximum slope of said first signals.

6. A system according to claim 1, wherein said processing means comprises a plurality of first processing means, each first processing means being associated with a respective sensor for appplying a respective predetermined algorithm to said corresponding first signal to generate a respective value, said first processing means being further effective for comparing said respective value with a respective predetermined threshold to generate said second signal, and said processing means including second processing means to which said second signals are fed to comparing said second signals with said set of predetermined second signals to generate said third signal.

7. A syseem according to claim 6, wherein said second processing means includes storage means for storing said predetermined thresholds which are used by said first processing means.

8. A system according to claim 7, wherein the content of said storage means can be changed.

9. A system according to claim 1, for use with documents of various denominations, at least one of said sensor assemblies being capable of sensing the denomination of a document.

10. Apparatus for storing articles, the apparatus comprising:

a transport system;

a diverter assembly to which articles are conveyed by said transport system;

an article monitoring system for monitoring at least one characteristic of articles fed by said transport system towards said diverter assembly, said article monitoring system including:

a plurality of sensor assemblies, each sensor assembly including a sensor for sensing a respective characteristic of an article and for generating a corresponding first signal; and processing means for applying respective predetermined alogorithms to each said first signal to generate respective values therefrom, for comparing said respective values with respective predetermined thresholds to generate second, binary signals indicating the relationship of each values with said corresponding threshold, and for comparing said second signals with a set of predetermined second signals corresponding to a known type of article to generate a third signal indicating the relationship between the second signals and the set of predetermined second signals; and said apparatus further including control means to causes said diverter assembly guide articles in a direction selected in accordance with said third signal from said processing means.

11. Sorting apparatus according to claim 10, wherein at least part of said transport system comprises two pairs of lateally offset belts positioned on opposite sides of a sheet feed path, wherein at least two sensors are positioned to sense characteristics on opposite sides of sheets as theyppass along said feed path defined by said offset belts.

12. Sorting apparatus according to claim 10, wherein said articles are banknotes.

13. Sorting apparatus according to claim 10, wherein said processing means generated each value by determining a respective one of the peak value, means value and maximum slope of said first signals.

* * * * *